United States Patent
Bartlett et al.

(10) Patent No.: US 8,965,367 B1
(45) Date of Patent: Feb. 24, 2015

(54) POLICY CONTROL FOR A CARRIER-AGGREGATION NETWORK

(75) Inventors: Roger Danforth Bartlett, Merriam, KS (US); Christian Erik Seagren, Pleasanton, KS (US); Jason Michael Kemper, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 323 days.

(21) Appl. No.: 13/605,699

(22) Filed: Sep. 6, 2012

(51) Int. Cl.
 *H04W 4/00* (2009.01)
(52) U.S. Cl.
 USPC ............ 455/435.1; 455/422.1; 455/454; 370/466; 370/338
(58) Field of Classification Search
 USPC ........ 455/436, 442, 435.1, 422.1, 403, 550.1, 455/575.9; 370/338, 410, 397, 466, 311, 370/352, 254, 328; 705/40, 35, 39; 375/E7.009
 See application file for complete search history.

(56) References Cited

U.S. PATENT DOCUMENTS

| | | | | |
|---|---|---|---|---|
| 5,625,877 | A * | 4/1997 | Dunn et al. | 455/454 |
| 6,055,567 | A * | 4/2000 | Ganesan et al. | 709/219 |
| 6,958,988 | B1 * | 10/2005 | Okagawa et al. | 370/338 |
| 7,257,131 | B2 * | 8/2007 | Smith | 370/466 |
| 7,286,560 | B2 * | 10/2007 | Samadi et al. | 370/466 |
| 7,460,524 | B2 * | 12/2008 | Khan | 370/353 |
| 8,175,047 | B2 * | 5/2012 | Seok et al. | 370/329 |
| 2002/0064149 | A1 * | 5/2002 | Elliott et al. | 370/352 |
| 2006/0099954 | A1 * | 5/2006 | Henderson et al. | 455/447 |
| 2010/0023699 | A1 * | 1/2010 | Reidel et al. | 711/134 |
| 2010/0161802 | A1 * | 6/2010 | Tofighbakhsh et al. | 709/226 |
| 2012/0033583 | A1 * | 2/2012 | Hu et al. | 370/254 |
| 2012/0054661 | A1 * | 3/2012 | Rados et al. | 715/772 |
| 2012/0327888 | A1 * | 12/2012 | Sankar et al. | 370/329 |

* cited by examiner

*Primary Examiner* — Mahendra Patel (57) ABSTRACT

A method, system, and medium are provided for regulating the allocation of radio-frequency (RF) channels in a carrier-aggregation network. A base station that is part of the carrier-aggregation network receives a registration request from a mobile station subscribing to services offered by a first wireless-telecommunications network within the carrier-aggregation network. The base station communicates the registration request to the first network and receives a set of policy parameters from the first network. The base station receives a service request from the mobile station. Based on the policy parameters and the service request and without communicating with the first network, the base station determines a set of RF channels available to the mobile station. The base station sends a resource assignment to the mobile station specifying the set of available RF channels.

18 Claims, 5 Drawing Sheets

ns network (e.g., the "core network") in a carrier-aggregation network to a base station that is also part of the carrier-aggregation network. The mobile station-specific policy decisions may include whether different radio frequency (RF) channels may be aggregated together to increase data transmission speeds for the mobile station; this decision may be based on, for example, the mobile station's subscription information. If channel aggregation is available to the mobile station, another policy decision may include whether RF channel aggregation should be implemented for the mobile station. This decision may be based on the nature of the data transaction associated with the mobile station. Shifting these decisions from the core network to the base station not only allows for faster communication speeds between the base station and mobile stations attached to the base station, but also decreases traffic to and from the core network which increases network efficiency.

POLICY CONTROL FOR A CARRIER-AGGREGATION NETWORK

SUMMARY

A high-level overview of various aspects of the invention is provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, the transfer of various mobile station-specific policy decisions from a wireless-telecommunications network (e.g., the "core network") in a carrier-aggregation network to a base station that is also part of the carrier-aggregation network. The mobile station-specific policy decisions may include whether different radio frequency (RF) channels may be aggregated together to increase data transmission speeds for the mobile station; this decision may be based on, for example, the mobile station's subscription information. If channel aggregation is available to the mobile station, another policy decision may include whether RF channel aggregation should be implemented for the mobile station. This decision may be based on the nature of the data transaction associated with the mobile station. Shifting these decisions from the core network to the base station not only allows for faster communication speeds between the base station and mobile stations attached to the base station, but also decreases traffic to and from the core network which increases network efficiency.

In one example, a base station that is part of the carrier-aggregation network receives a registration request from a mobile station subscribing to services offered by the core network. The base station communicates the registration request to the core network and, after the core network authenticates the mobile station, the base station receives a set of policy parameters from the core network. The base station receives a service request from the mobile station. Based on the set of policy parameters and features associated with the service request and without communicating with the core network, the base station determines a set of RF channels available to the mobile station. The base station then communicates a resource assignment to the mobile station specifying the set of RF channels available to the mobile station.

BRIEF DESCRIPTION OF SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Further, various technical terms are used throughout this description. An illustrative resource that fleshes out various aspects of these terms can be found in Newton's Telecom Dictionary, 25th Edition (2009).

Embodiments of the present invention may be embodied as, among other things, a method, system, or set of instructions embodied on one or more computer-readable media. Computer-readable media comprise physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems, and computer-readable medium for use in transferring various policy decisions from a first wireless-telecommunications network (e.g., the "first network") in a carrier-aggregation network to a base station that is also part of the carrier-aggregation network. The policy decisions may include whether aggregated radio-frequency (RF) channels (hereinafter known as "channel aggregation") are available to a mobile station subscribing to services offered by the first network. If channel aggregation is available to the mobile station, another policy decision may include whether RF channel aggregation should be implemented for the mobile station. This decision may be based on the nature of the data transaction associated with the mobile station.

In one aspect, the base station receives a registration request from a mobile station subscribing to services offered by the first network. The base station communicates the registration request to the first network and subsequently receives a set of policy parameters from the first network. The base station receives a service request from the mobile station. Based on the set of policy parameters and the service request and without communicating with the network, the base station determines a set of RF channels available to the mobile station. The base station communicates a resource assignment to the mobile station specifying the set of RF channels available to the mobile station.

In a second aspect, a wireless-telecommunications network (e.g., the "network") within the carrier-aggregation network receives from a base station within the carrier-aggregation network a registration request for a mobile station subscribing to services offered by the network. The network determines a set of policy parameters associated with the mobile station after authenticating and authorizing the mobile station. The set of policy parameters indicates whether channel aggregation is available to the mobile station. The network communicates the set of policy parameters to the base station. In turn, the base station uses the set of policy parameters to determine RF channels available to the mobile station.

In a third aspect, a base station that is part of a carrier-aggregation network receives a set of policy parameters from a first wireless-telecommunications network (e.g., the "first network") that is part of the carrier-aggregation network. The base station receives a service request from a mobile station subscribing to services offered by the first network. Based on the set of policy parameters and without communicating with the first network, the base station determines whether channel aggregation is available to the mobile station. The base station communicates a first resource assignment specifying a first set of RF channels available to the mobile station when it is determined that channel aggregation is available to the mobile station. The base station communicates a second resource assignment specifying a second set of RF channels available to the mobile station when it is determined that channel aggregation is not available to the mobile station.

By way of background, to meet long-term evolution (LTE) or LTE-Advanced requirements, wireless telecommunications networks are entering into agreements to share network resources. LTE-Advanced is a mobile communications standard that has recently been finalized by the 3$^{rd}$ Generation Partnership Project (3GPP). LTE-Advanced is designed to augment the existing LTE standard and embodies features targeted to, among other things, raising peak downlink data rates, reducing latency, and increasing spectrum efficiency. The achievement of these standards is difficult for a single network because of the limited RF spectrum bandwidths available to the network. To achieve more bandwidth, multiple networks, having either contiguous or non-contiguous RF spectrums, aggregate together to achieve the wider bandwidths. In one instance, a single network may aggregate two or more RF spectrum bandwidths owned by the single network to achieve the wider bandwidth. For the purposes of this application, this type of relationship is known as a carrier-aggregation network.

Figure 1:
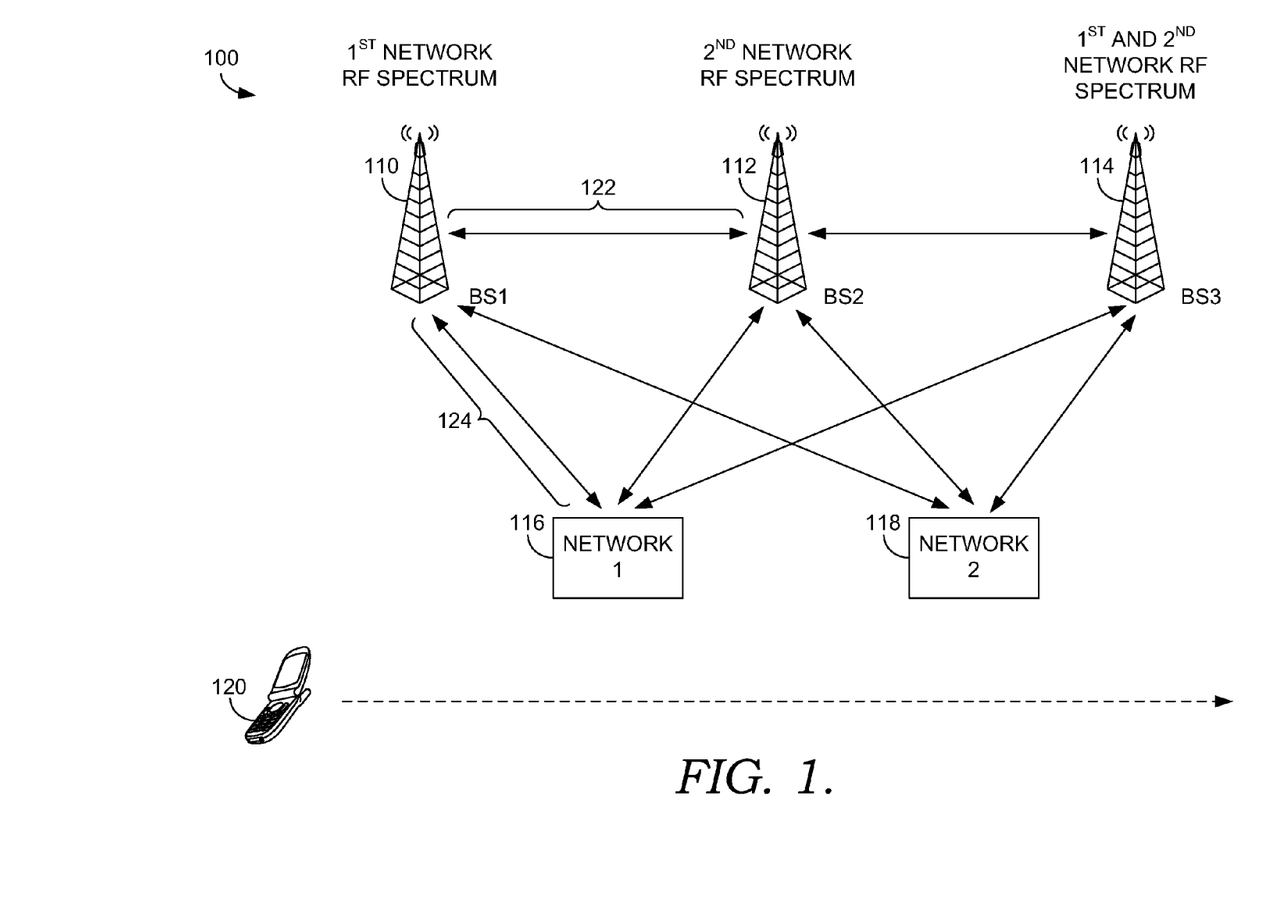
FIG. 1 depicts an illustrative carrier-aggregation operating environment suitable for practicing an embodiment of the technology.

Turning now to FIG. 1, an illustrative carrier-aggregation network is depicted according to one embodiment and is referenced generally by the numeral 100. The network 100 includes a first wireless-telecommunications network 116 and a second wireless-telecommunications network 118 that have entered into a carrier-aggregation agreement to share and/or aggregate the networks' respective RF spectrum bandwidths. Although not shown, additional wireless-telecommunications networks may be included in the network 100.

The network 100 further includes a first base station 110, a second base station 112, and a third base station 114. Although the term "base station" is used throughout this application, equivalent terms may include radio access node, eNodeB, and Node B. Each of the base stations 110, 112, and 114 includes hardware and bandwidth(s) of a specified frequency. The hardware includes, for example, the actual radio mast or tower, as well as antennas, transceivers, GPS receivers, electrical power sources, digital signal processors, control electronics, and the like that are associated with the radio tower. The RF spectrum bandwidth may comprise one or more channels. With respect to this application, the term "channel" refers to an upload spectrum and a download spectrum. If there is more than one channel, the radio frequencies associated with the channels may be contiguous or non-contiguous. Further, each channel may vary in terms of the amount of bandwidth in the channel—some channels may encompass a small amount of bandwidth while other channels may encompass a large amount of bandwidth. Any and all such variations are contemplated as being within the scope of the invention.

The first base station 110 depicts a carrier-aggregation resource scenario where the RF spectrum bandwidth is owned by the first network 116. As discussed above, the RF spectrum bandwidth associated with the first base station 110 may comprise one or multiple channels that are contiguous or non-contiguous in nature. Further, the RF spectrum bandwidth owned by the first network may comprise a first RF bandwidth that includes a first set of channels and a second RF bandwidth that includes a second set of channels. The first and second RF bandwidths may be contiguous or non-contiguous.

The second base station 112 depicts a carrier-aggregation resource scenario where the RF spectrum bandwidth is owned by the second network 118. Again, the RF spectrum bandwidth associated with the second base station 112 may comprise one or more channels; the channels may be contiguous or non-contiguous. The third base station 114 depicts a carrier-aggregation resource scenario where the RF spectrum bandwidth is owned by both the first network 116 and the second network 118. For example, the first network 116 may own a first set of channels that makes up a first RF spectrum bandwidth associated with the third base station 114, and the second network 118 may own a second set of channels that makes up a second RF spectrum bandwidth associated with the third base station 114.

The different base stations 110, 112, and 114 are meant to illustrate some of the various types of RF spectrum-sharing or channel-aggregation scenarios that exemplify the network 100. For instance, channel aggregation may include the aggregation of channels within a first RF spectrum bandwidth associated with the base station 110, 112, or 114. In another example, channel aggregation may include the aggregation of channels across two different RF spectrum bandwidths associated with the base station 110, 112, or 114. The RF spectrum-sharing or channel-aggregation scenarios illustrated by the base stations 110, 112, and 114 are not meant to be limiting. Additional types of channel-aggregation scenarios not illustrated in FIG. 1 are contemplated as being within the scope of the invention. For example, besides sharing RF spectrum bandwidths and/or channels, networks may also enter into agreements to share hardware associated with the base stations 110, 112, and 114. By way of illustration only, the first network 116 may own the hardware associated with the second base station 112 but lease the RF spectrum bandwidth from the second network 118.

The base stations 110, 112 and 114 may be in communication with each other as illustrated by, for example, wireless-telecommunications link 122. As well, the base stations 110, 112 and 114 may be in communication with the first network 116 and the second network 118 via wireless-telecommunications links such as, for example, wireless-telecommunications link 124. The base stations 110, 112 and 114 may communicate with each other using the wireless-telecommunications links (e.g., the link 122) to facilitate handoffs or handovers between the different base stations when a mobile station (e.g., mobile station 120) moves from one base station to the next. The base stations 110, 112 and 114 may also communicate with the first and second networks 116 and 118 using the wireless-telecommunications links (e.g., the link 124) when a handoff occurs between the different base stations 110, 112 and 114.

The communication between a base station and, for example, the first network 116, may be in the form of a signaling message. By way of illustrative example, the mobile station 120 may subscribe to services offered by the first network 116. The mobile station 120 may initially be attached to the first base station 110. The mobile station 120 attempts to attach to the second base station 112 because, for example, the signal from the first base station 110 is weakening as a result of the mobile station 120 moving outside the range of the first base station 110. As mentioned above, there may be communications between the first base station 110 and the second base station 112 (using, for example, the link 122) concerning the handoff between the first base station 110 and the second base station 112. During the attachment process to the second base station 112, the second base station 112 sends a signaling message, via the link 124, in the form of a registration request to the first network 116. The signaling message may include authentication/authorization credentials associated with the mobile station 120. After the network 116 authorizes the attachment of the mobile station 120 to the second base station 112, the mobile station 120 begins to use the hardware and RF spectrum associated with the second base station 112 to send and/or receive information.

The illustrative network environment 100 shown in FIG. 1 is merely an example of one suitable carrier-aggregation networking environment and is not intended to suggest any limitation as to the scope of use or functionality of embodiments of the present invention. Neither should the network environment 100 be interpreted as having any dependency or requirement related to any single module/component or combination of modules/components illustrated therein. Further, although lines are depicted between some of the components, these lines are not intended to suggest any limitation as to the scope of use or functionality of embodiments of the present invention. The components depicted in FIG. 1 may communicate with each other through hard-wired connections or through wireless connections.

Figure 2:
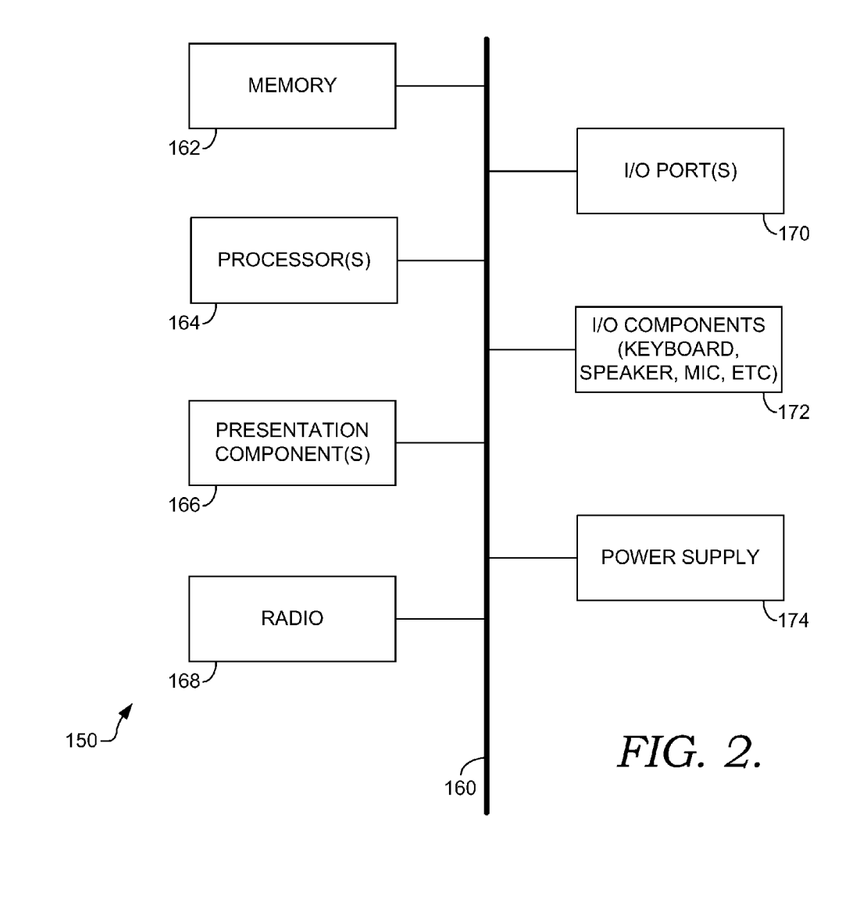
FIG. 2 depicts an exemplary mobile station according to an embodiment of the technology.

Turning now to FIG. 2, a block diagram of an illustrative communications device is provided and referenced generally by the numeral 150. The communications device 150 may include the mobile station 120 of FIG. 1. Although some components are shown in the singular, they may be plural. For example, the communications device 150 might include multiple processors or multiple radios, etc. As illustratively shown, the communications device 150 includes a bus 160 that directly or indirectly couples various components together including memory 162, a processor 164, a presentation component 166, a radio 168, input/output ports 170, input/output components 172, and a power supply 174.

The memory 162 might take the form of memory components previously described. Thus, further elaboration will not be provided here, only to say that the memory component 162 can include any type of medium that is capable of storing information (e.g., a database). A database can be any collection of records. In one embodiment, the memory 162 includes a set of embodied computer-executable instructions that, when executed, facilitates various aspects disclosed herein. These embodied instructions will variously be referred to as "instructions" or an "application" for short.

The processor 164 might actually be multiple processors that receive instructions and process them accordingly. The presentation component 166 includes the likes of a display, a speaker, as well as other components that can present information (such as a lamp (LED), or even lighted keyboards).

The radio 168 facilitates communication with a wireless-telecommunications-network. Illustrative wireless-telecommunications technologies include CDMA, GPRS, TDMA, GSM, and the like (including what is known in the art as WiMax technology and also Long Term Evolution (LTE) or LTE-Advanced). In some embodiments, the radio 168 might also facilitate other types of wireless communications including Wi-Fi®, Bluetooth® communications, GIS communications, and other near-field communications.

The input/output port 170 might take on a variety of forms. Illustrative input/output ports include a USB jack, stereo jack, infrared port, proprietary communications ports, and the like. The input/output components 172 include items such as keyboards, microphones, speakers, touch screens, and any other item usable to directly or indirectly input data into the communications device 150. Power supply 174 includes items such as batteries, fuel cells, or any other component that can act as a power source to power the communications device 150.

Figure 3:
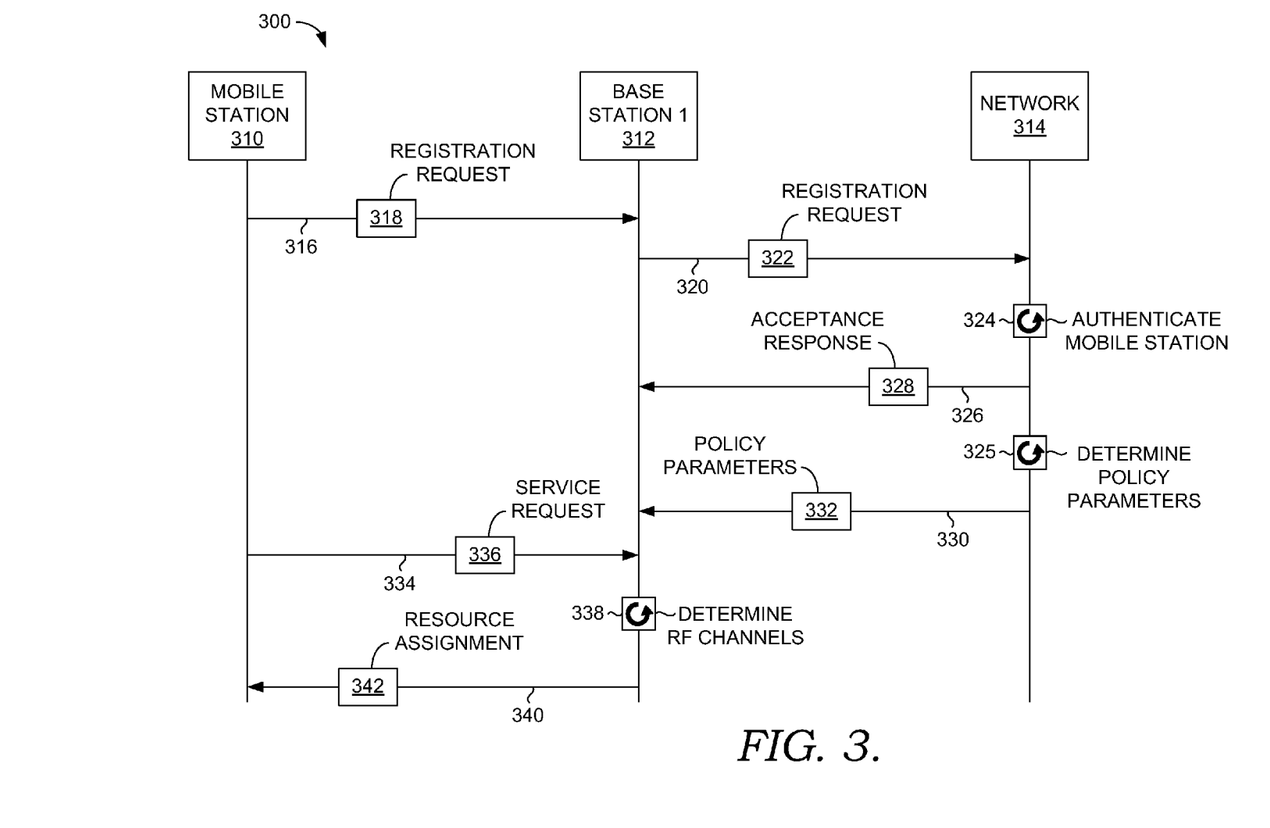
FIG. 3 depicts an illustrative process-flow diagram that depicts a method of regulating the allocation of radio-frequency (RF) channels in a carrier-aggregation network according to an embodiment of the technology.

Turning now to FIG. 3, a process-flow diagram, referenced generally by the numeral 300, is depicted illustrating a method of regulating the availability of aggregated RF channels from a base station within a carrier-aggregation network. FIG. 3 includes a mobile station 310, a base station 312, and a network 314.

The mobile station 310 subscribes to services offered by the network 314 and may be any type of wireless-telecommunications device. Such devices may include any type of fixed, mobile, and portable devices including cellular telephones, personal digital assistants, and devices that are built into automobiles. The mobile station 310 may correspond to the mobile station 120 of FIG. 1 or the communications device 150 of FIG. 2.

The base station 312 has one or more associated RF spectrum bandwidths. The RF spectrum bandwidth(s) may include one or more channels with each channel comprising an upload spectrum and a download spectrum. The different channels may have varying amounts of bandwidth as compared to one another. For instance, some channels may have a large amount of bandwidth while other channels may have a small amount of bandwidth. The channels may comprise frequency bandwidths that are contiguous with each other and/or frequency bandwidths that are not contiguous with each other. Further, the channels may be solely owned by the network 314, or the channels may be solely owned by a second network (not shown). In another aspect, a first set of channels associated with the base station 312 may be owned by the network 314 and a second set of channels associated with the base station 312 may be owned by a second network (not shown). Any and all such variations are within the scope of the invention.

The network 314 may correspond to the first network 116 of FIG. 1 or the second network 118 of FIG. 1. The network 314 may comprise in part a home agent (not shown). The home agent is a router on the network 314 that serves as the point for communications with the mobile station 310. The network 314 may be in communication with a subscriber profile system that stores policy parameters for each user subscribing to services offered by the network 314. The network 314 may have entered into a carrier-aggregation agreement with one or more other networks whereby the networks agree to share base stations (hardware, RF channels, or both).

At a step 316, a registration request 318 from the mobile station 310 is received by the base station 312. The registration request 318 is a request from the mobile station 310 to utilize resources (e.g., RF channels) associated with the base station 312. The registration request 318 may include user credentials identifying the mobile station 310 and the user of the mobile station 310.

At a step 320, the registration request, now labeled as the registration request 322, is communicated from the base station 312 to the network 314. In one aspect, the registration request 322 along with the appropriate user credentials is directly communicated from the mobile station 310 to the network 314. At a step 324, the network 314 processes the registration request 322. The processing may be in the form of an authentication and authorization process. At a step 326, an acceptance response 328 is communicated from the network 314 to the base station 312. Subsequent to receiving the acceptance response 328, the mobile station 310 attaches to the base station 312.

As part of the authentication/authorization step 324, or as a second step 325, the network 314 determines policy parameters. The policy parameters may be general to the network 314, specific to the mobile station 310, or a combination of both. Network policy parameters include quality of service (QoS) indices. QoS indices may include a variety of requirements directed to all aspect of connectivity such as service response times, interrupts, delays, grade of service, and the like. QoS indices may also be directed toward management of network loads. For example, QoS indices may determine the order of data transmission when a RF channel is loaded. By way of illustrative example, QoS indices may indicate that emergency calls have priority over other types of data transmission, or that voice packets have precedence over video packets.

Policy parameters specific to the mobile station 310 may be retrieved by the network 314 from a subscriber profile system. Parameters specific to the mobile station 310 may include subscription plan information, preferred services for different types of user applications, data transmission limits, time and site restrictions, capabilities associated with the mobile station 310, and the like. In turn, the subscription plan information includes, among other things, whether the mobile station user has subscribed to faster data transmission speeds utilizing channel aggregation (e.g., multiple RF channels) across one or more RF spectrum bandwidths.

At a step 330, the policy parameters 332 are communicated by the network 314 to the base station 312. This may be a separate communication from the acceptance response 328 or the policy parameters 332 may be communicated within the acceptance response 328. In one aspect, if the policy parameters 332 indicate that channel aggregation is available to the mobile station 310, the network 314 may include a predetermined internet protocol (IP) address with the policy parameters 332. The predetermined IP address indicates to other network elements that channel aggregation is available to the mobile station 310. In another aspect, instead of using the predetermined IP address to indicate the availability of channel aggregation, an identifier may be used instead. Any and all such aspects are contemplated as being within the scope of the invention.

At a step 334, a service request 336 is communicated from the mobile station 310 to the base station 312. The service request 336 includes information about a data transaction that the mobile station 310 wants to initiate at the base station 312. For instance, the user of the mobile station 310 may wish to view a video, upload an application, browse the Internet, play a game, or make a voice call. Each of these different transactions may require a different amount of channels or RF bandwidth. For example, a simple voice call requires less bandwidth and/or channels than uploading a large application. The service request 336 may also include information indicating whether the mobile station 310 is capable of supporting channel aggregation.

In one aspect, at a step 338, the base station 312 utilizes the policy parameters 332 to determine what RF channels to assign to the mobile station 310. When the policy parameters 332 indicate that channel aggregation is available to the mobile station 310, the base station 312 determines a first set of RF channels available to the mobile station 310. Because channel aggregation is available to the mobile station 310, the RF channels may comprise more than one channel within a RF spectrum bandwidth or more than one channel across different RF spectrum bandwidths. As explained above, the RF channels may be solely owned by the network 314, solely owned by a second network, or certain channels may be owned by the network 314 and the remaining channels owned by the second network. When the policy parameters 332 indicate that channel aggregation is not available to the mobile station 310 because the mobile station 310 does not have a subscription for channel aggregation, the base station 312 determines a second set of channels available to the mobile station 310. In this case, the second set of channels comprises a single RF channel that may be owned by the network 314 or by owned by a second network. The determination by the base station 312 of whether channel aggregation is available to the mobile station 310 occurs without communicating with the network 314. This decreases traffic to and from the network and increases feedback times to the mobile station 310.

In another aspect of the invention, at the step 338, the base station 312 utilizes the policy parameters 332 and the service request 336 to determine whether channel aggregation should be implemented for the mobile station 310. Like above, the policy parameters 322 indicate whether channel aggregation is available to the mobile station 310. If channel aggregation is available to the mobile station 310, the base station 312 uses the service request 336 to determine whether channel aggregation should be implemented. By way of illustrative example, the policy parameters 332 indicate that channel aggregation is available to the mobile station 310, and the service request 336 indicates that the mobile station 310 is initiating a voice call. Based on this information, and even though channel aggregation is available to the mobile station 310, the base station 312 determines that allocating one RF channel would adequately meet the service request 336. In another illustrative example, the policy parameters 332 indicate that channel aggregation is available to the mobile station 310, and the service request 336 indicates that the mobile station 310 is initiating an online gaming session. Based on this information, the base station 312 determines that allocating two channels will meet the service request 336.

Besides the examples provided above, the base station 312 may make even more granular determinations of RF channel allocation depending on the context of the service request 336 and other factors. For example, RF channels of a wider bandwidth may be assigned if the service request 336 indicates that such a bandwidth is optimal for performance of the request 336. In another example, more than two RF channels may be determined if the service request 336 indicates that more than two RF channels would be beneficial for optimal performance. Like above, these determinations by the base station 312 occur without communication to or from the network 314. Further, determinations of RF channels may be dependent upon network load, terms of the carrier-aggregation agreement, time of day, time of year, whether the user of the mobile station is a business or a private user, and the like.

Besides making determinations regarding RF channel allocation, the base station 312 is configured to make additional determinations based on the policy parameters 332. One such determination is the order of data transmission based on QoS indices in the policy parameters 332. As mentioned above, there are QoS indices that indicate the order of data transmission when the RF channel(s) is loaded. Instead of having the network 314 implement this policy, the base station 312 implements the order transmission policy—again saving on traffic to and from the network and increasing response times.

The base station 312 is further configured to apply throttling measures based on the policy parameters 332. Throttling refers to the intentional slowing of service in an attempt to regulate network traffic and minimize bandwidth congestion. Throttling may also be used when a mobile station (e.g., the mobile station 310) approaches its data transmission limits. Instead of the network 314 applying throttling measures, the base station 312, using the policy parameters 332, may determine that the mobile station 310 is approaching its data transmission limit and begin to limit the mobile station's data transmission. Again, this determination may be made without communication between the base station 312 and the network 314.

At a step 340, a resource assignment 342 is communicated by the base station 312 to the mobile station 310. The resource assignment 342 specifies the RF channel(s) available to the mobile station 310. At this point, the mobile station 310 begins using the specified RF channel(s) for data transmission.

During data transmission, the mobile station 310 may communicate a second service request indicating that the nature of the data transmission is changed. For example, the user of the mobile station 310 may have finished viewing a video and is now attempting to initiate a voice call, or data transmission needs for a particular application may have decreased or increased. Based on the second service request and the policy parameters 332, the base station 312 makes another determination of RF channels and communicates a second resource assignment to the mobile station 310. This back-and-forth communication between the base station 312 and the mobile station 310 may occur multiple times during the course of a user session. The communication exchanges between the base station 312 and the mobile station 310 occur without involvement of the network 314.

Figure 4:
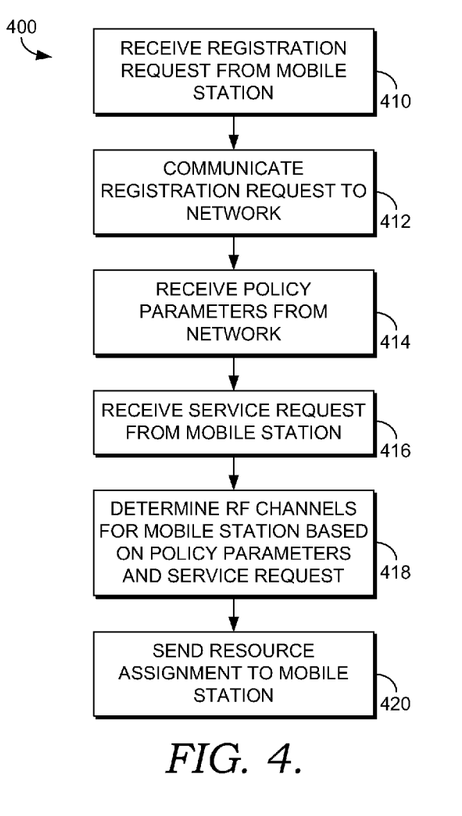
FIG. 4 depicts an illustrative flow diagram that depicts an exemplary method for a base station in a carrier-aggregation network to regulate the allocation of RF channels according to an embodiment of the technology.

FIG. 4 depicts a flow diagram, referenced generally by the numeral 400, illustrating a method of regulating the availability of channel aggregation and the allocation of RF channels in a carrier-aggregation network. The carrier-aggregation network includes at least a first wireless-telecommunications network (the "first network") and a second wireless-telecommunications network (the "second network"). The first network may correspond to the network 314 of FIG. 3.

At a step 410, a base station (such as the base station 312 of FIG. 3) that is part of the carrier-aggregation network receives a registration request from a mobile station (such as the mobile station 310 of FIG. 3) subscribing to services offered by the first network. The registration request comprises, in part, a request to utilize RF spectrum bandwidth associated with the base station. The RF spectrum bandwidth associated with the base station comprises one or more RF channels that may be owned wholly by the first network, or in part by the first network and the second network. Each channel comprises an upload spectrum and a download spectrum.

At a step 412, the base station communicates the registration request to the first network, and, at a step 414, the base station receives a set of policy parameters from the first network. This may occur after the first network has authenticated and authorized the mobile station. The set of policy parameters comprises at least a mobile station-specific subscription plan and network-specific QoS indices. The mobile station-specific subscription plan may include information relating to whether the user of the mobile station subscribes to channel aggregation, data transmission limits associated with the mobile station, and/or preferred services for different applications utilized by the mobile station. The network-specific QoS indices indicate, among other things, an order of data transmission when RF channels are loaded.

At a step 416, the base station receives a first service request from the mobile station. The first service request may include information about capabilities of the mobile station (i.e., whether the mobile station supports channel aggregation), and information concerning the type of data transaction associated with the service request.

At a step 418, the base station utilizes the set of policy parameters and the first service request to determine a first set of RF channels available to the mobile station. This is accomplished without the base station communicating with the first network. If the mobile station subscribes to channel aggregation and if the service request indicates that multiple RF channels would be effectively and efficiently utilized to execute the data transaction, the base station determines multiple RF channels for the mobile station. If the mobile station subscribes to channel aggregation, but the service request indicates that only one RF channel is needed to complete the data transaction, the base station determines one RF channel for the mobile station. On the other hand, if the policy parameters indicate that channel aggregation is not available to the mobile station, or if the service request indicates that the mobile station is not capable of supporting channel aggregation, the base station determines one RF channel for the mobile station.

At a step 420, the base station communicates a resource assignment to the mobile station specifying the RF channels determined to be available to the mobile station; this is also done without involvement of the first network. The method 400 may further include receiving a second service request from the mobile station related to the data transaction that was the subject of the first service request. The second service request may indicate that the bandwidth requirements of the first data transaction have changed, or that the bandwidth requirements of the first data transaction are unchanged. Based on the policy parameters and the second service request, the base station determines a second set of RF channels available to the mobile station. If the bandwidth requirements have changed, the second set of RF channels may comprise more or less RF channels than previously determined. If the bandwidth requirements remain unchanged, the second set of RF channels may be the same as the first set of RF channels.

The second service request from the mobile station may also relate to a new data transaction. Based on the policy parameters and the second service request, the base station determines a new set of RF channels available to the mobile station. If the bandwidth requirements have changed, the new set of RF channels may comprise more or less RF channels than previously determined. If the bandwidth requirements remain unchanged, the new set of RF channels may be the same as the first set of RF channels.

Figure 5:
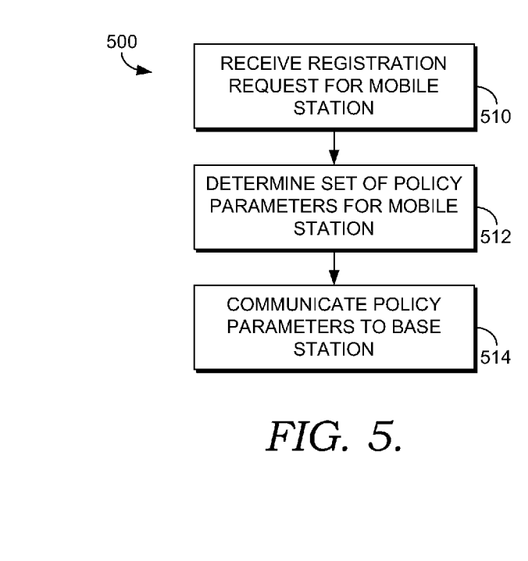
FIG. 5 depicts an illustrative flow diagram that depicts an exemplary method for a network in a carrier-aggregation network to determine and communicate policy parameters to a base station that is part of the carrier-aggregation network according to an embodiment of the technology.

Turning to FIG. 5, FIG. 5 depicts a flow diagram, referenced generally by the numeral 500, illustrating a method of regulating the allocation of RF channels in a carrier-aggregation network comprising at least a first wireless-telecommunications network (the "first network") and a second wireless-telecommunications network (the "second network"). At a step 510, the first network receives a registration request from a base station that is part of the carrier-aggregation network. The registration request is for a mobile station subscribing to services offered by the first network to utilize the RF spectrum bandwidth associated with the base station.

At a step 512, the first network determines a set of policy parameters associated with the mobile station; this may occur after the first network authenticates and authorizes the mobile station. The policy parameters comprise an indication, in part, of whether the mobile station subscribes to channel aggregation. As mentioned earlier, the policy parameters include mobile station-specific policy parameters and network-specific policy parameters. At a step 514, the policy parameters are communicated to the base station where they are used by the base station to determine one or more RF channels to make available to the mobile station.

Figure 6:
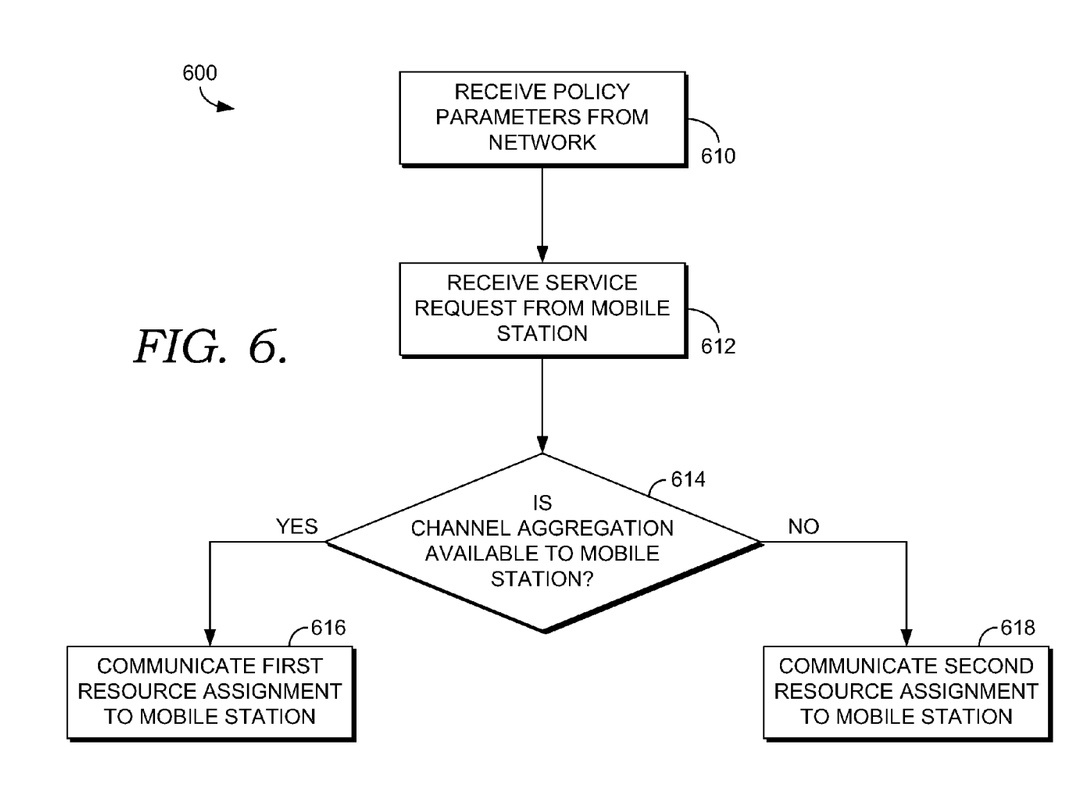
FIG. 6 depicts an illustrative flow diagram that depicts an exemplary method for a base station in a carrier-aggregation network to regulate the allocation of RF channels according to an embodiment of the technology.

FIG. 6 depicts a flow diagram, referenced generally by the numeral 600, illustrating a method of determining whether channel aggregation is available to a mobile station and regulating the allocation of RF channels to the mobile station based on the availability of channel aggregation in a carrier-aggregation network comprising at least a first wireless-telecommunications network (the "first network") and a second wireless-telecommunications network (the "second network"). At a step 610, a base station that is part of the carrier-aggregation network receives a set of policy parameters from the first network; the policy parameters may be received after the first network authenticates and authorizes the mobile station. The policy parameters indicate if the mobile station subscribes to channel aggregation. At a step 612, the base station receives a service request from the mobile station. Besides including information concerning the nature of the data transaction that is the subject of the service request, the service request may indicate whether the mobile station is capable of supporting channel aggregation.

At a step 614, the base station, utilizing the policy parameters, makes a determination of whether channel aggregation is available to the mobile station. When channel aggregation is available, then, at a step 616, the base station communicates a first resource assignment to the mobile station specifying a first set of RF channels available to the mobile station. In one aspect, the first set of RF channels comprises more than one channel. When, at the step 614, it is determined that channel aggregation is not available to the mobile station, then, at a step 618, the base station communicates a second resource assignment specifying a second set of RF channels available to the mobile station. In one aspect, the second set of RF channels comprises one channel.

The method 600 may further comprise subsequent to determining that channel aggregation is available to the mobile station, determining characteristics of the data transaction associated with the first service request. Based on the characteristics of the data transaction, the base station may modify the first resource assignment. For instance, if the characteristics of the data transaction indicate that utilization of channel aggregation would be advantageous, the base station may modify the first resource assignment so that it includes additional RF channels.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-useable instructions embodied thereon for performing a method of regulating the allocation of radio-frequency (RF) channels in a carrier-aggregation network comprising at least a first wireless-telecommunications network (the "first network") and at least a second wireless-telecommunications network (the "second network"), the method comprising:
   at a base station that is part of the carrier-aggregation network:
   receiving a registration request from a mobile station subscribing to services offered by the first network;
   communicating the registration request to the first network;
   receiving a set of policy parameters from the first network, the set of policy parameters comprising a mobile station-specific subscription plan associated with the mobile station and network-specific quality of service (QoS) indices, wherein the mobile station-specific subscription plan comprises data transmission limits associated with the mobile station, and wherein the base station decreases upload speeds when the mobile station is approaching its data transmission limits;
   receiving a first service request from the mobile station, the first service request corresponding to a first data transaction;
   based on the set of policy parameters and the first service request and without communicating with the first network, determining a first set of RF channels available to the mobile station; and
   sending a resource assignment to the mobile station specifying the first set of RF channels available to the mobile station.

2. The media of claim 1, further comprising:
   determining an order of transmission for the first data transaction based at least in part on the QoS indices and network load.

3. The media of claim 2, wherein the mobile station-specific subscription plan comprises at least:
   (1) parameters indicating whether channel aggregation is available to the mobile station,
   (2) and
   (3) preferred services for different applications utilized by the mobile station.

4. The media of claim 1, wherein the first service request indicates that the mobile station supports channel aggregation.

5. The media of claim 1, further comprising:
   receiving a second service request from the mobile station, the second service request corresponding to the first data transaction;
   based on the set of policy parameters and the second service request, determining a second set of RF channels available to the mobile station; and
   without communicating with the first network, sending a second resource assignment to the mobile station specifying the second set of RF channels available to the mobile station.

6. The media of claim 5, wherein the first set of RF channels is the same as the second set of RF channels.

7. The media of claim 5, wherein the first set of RF channels is different from the second set of RF channels.

8. A method of regulating the allocation of radio-frequency (RF) channels in a carrier-aggregation network comprising at least a first wireless-telecommunications network (the "first network") and at least a second wireless-telecommunications network (the "second network"), the method comprising:

at the first network:
receiving from a base station that is part of the carrier-aggregation network a registration request for a mobile station subscribing to services offered by the first network;
determining a set of policy parameters associated with the mobile station, the set of policy parameters comprising an indication of whether channel aggregation is available to the mobile station, the set of policy parameters further comprising a user-specific subscription plan associated with the mobile station and network-specific quality of service (QoS) indices, wherein the user-specific subscription plan comprises data transmission limits associated with the mobile station, and wherein the base station decreases upload speeds when the mobile station is approaching its data transmission limits; and
communicating the set of policy parameters to the base station, the set of policy parameters useable by the base station to determine one or more radio-frequency (RF) channels available to the mobile station without communicating with the first network.

9. The method of claim 8, wherein the set of policy parameters includes user-specific policy parameters and network-specific policy parameters.

10. The method of claim 9, wherein the network-specific policy parameters comprise general quality of service (QoS) indices specifying an order of transmission for data packets when the one or more RF channels are fully loaded.

11. One or more non-transitory computer-readable storage media having computer-useable instructions embodied thereon for performing a method of regulating the allocation of radio-frequency (RF) channels in a carrier-aggregation network comprising at least a first wireless-telecommunications network (the "first network") and at least a second wireless-telecommunications network (the "second network"), the method comprising:

at a base station that is part of the carrier-aggregation network:
receiving a set of policy parameters from the first network, the set of policy parameters specific to a mobile station subscribing to services offered by the first network, the set of policy parameters comprising a mobile station-specific subscription plan associated with the mobile station and network-specific quality of service (QoS) indices, wherein the mobile station-specific subscription plan comprises data transmission limits associated with the mobile station, and wherein the base station decreases upload speeds when the mobile station is approaching its data transmission limits;
receiving a service request from the mobile station, the service request corresponding to a data transaction;
based on the set of policy parameters received from the first network and without communicating with the first network, determining whether channel aggregation is available to the mobile station, and
(1) communicating a first resource assignment specifying a first set of RF channels available to the mobile station when it is determined that channel aggregation is available to the mobile station, or
(2) communicating a second resource assignment specifying a second set of RF channels available to the mobile station when it is determined that channel aggregation is not available to the mobile station.

12. The media of claim 11, wherein the first set of RF channels is associated with the first network.

13. The media of claim 11, wherein the first set of RF channels is associated with the first network and the second network.

14. The media of claim 11, wherein the first set of RF channels is associated with the second network.

15. The media of claim 11, further comprising:
subsequent to determining that channel aggregation is available to the mobile station, determining characteristics of the data transaction; and
based on the characteristics of the data transaction, modifying the first resource assignment.

16. The media of claim 11, wherein the first resource assignment is dependent upon a time of day the service request is received.

17. The media of claim 11, wherein the first set of RF channels comprises more than one channel.

18. The media of claim 11, wherein the second set of RF channels comprises one channel.

* * * * *